(12) United States Patent
Lee et al.

(10) Patent No.: US 8,509,176 B2
(45) Date of Patent: *Aug. 13, 2013

(54) METHOD FOR TRANSMITTING AND RECEIVING DATA IN A WIRELESS COMMUNICATION SYSTEM

(75) Inventors: Wook Bong Lee, Anyang-si (KR); Han Gyu Cho, Anyang-si (KR); Sung Ho Moon, Anyang-si (KR); Jin Sam Kwak, Anyang-si (KR); Bin Chul Ihm, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,372

(22) PCT Filed: Apr. 12, 2010

(86) PCT No.: PCT/KR2010/002237
§ 371 (c)(1),
(2), (4) Date: Dec. 27, 2011

(87) PCT Pub. No.: WO2010/120076
PCT Pub. Date: Oct. 21, 2010

(65) Prior Publication Data
US 2012/0093080 A1   Apr. 19, 2012

Related U.S. Application Data

(60) Provisional application No. 61/169,304, filed on Apr. 14, 2009.

(30) Foreign Application Priority Data

Jul. 24, 2009 (KR) .................. 10-2009-0067777

(51) Int. Cl.
*H04W 72/06* (2009.01)
*H04J 1/00* (2006.01)
*H04J 3/16* (2006.01)
*H04B 7/02* (2006.01)

(52) U.S. Cl.
USPC ........... 370/329; 370/208; 370/281; 370/337; 370/344; 370/468; 375/267; 375/295; 455/450

(58) Field of Classification Search
USPC .................. 370/203, 206, 208–210, 278, 280, 370/294.295, 328, 329, 335–337, 342–343, 370/464, 479; 375/260; 455/450
See application file for complete search history.

(56) References Cited

U.S. PATENT DOCUMENTS 7,715,442 B2 *   5/2010   Trainin et al. .................. 370/503
7,760,617 B2 *   7/2010   Yoon et al. ..................... 370/208

(Continued)

FOREIGN PATENT DOCUMENTS

KR   1020070042442   4/2007
KR   1020070119963   12/2007

*Primary Examiner* — Candal Elpenord
(74) *Attorney, Agent, or Firm* — Lee, Hong, Degerman, Kang & Waimey

(57) ABSTRACT

A method of transmitting and receiving data in a wireless communication system is disclosed. In the method of transmitting the data in the wireless communication system, a base station transmits downlink data to a first terminal supporting a first system through a first zone of a frame, and transmits downlink data to a second terminal supporting a second system through a second zone located at a location separated from the first zone backwardly by a frame offset on a time axis. The wireless communication system may support a bandwidth of 8.75 MHz, the frame offset is an offset between a start point of a frame for the first system and a start point of a frame for the second system, and the first zone includes 3+6*(frame offset−1) Orthogonal Frequency Division Multiplexing (OFDM) symbols.

6 Claims, 10 Drawing Sheets

(56) References Cited

U.S. PATENT DOCUMENTS

| | | | |
|---|---|---|---|
| 7,885,214 B2* | 2/2011 | Ahmadi et al. | 370/295 |
| 8,005,182 B2* | 8/2011 | Park et al. | 375/373 |
| 8,031,583 B2* | 10/2011 | Classon et al. | 370/208 |
| 8,072,929 B2* | 12/2011 | Frederiksen et al. | 370/329 |
| 8,204,025 B2* | 6/2012 | Cai et al. | 370/337 |
| 8,315,330 B2* | 11/2012 | Moon et al. | 375/295 |
| 2009/0067377 A1* | 3/2009 | Talukdar et al. | 370/329 |
| 2009/0185483 A1* | 7/2009 | McBeath et al. | 370/221 |
| 2011/0103494 A1* | 5/2011 | Ahmadi | 375/260 |

* cited by examiner

METHOD FOR TRANSMITTING AND RECEIVING DATA IN A WIRELESS COMMUNICATION SYSTEM

CROSS-REFERENCE TO RELATED APPLICATIONS

This application is the National Stage filing under 35 U.S.C. a 371 of International Application No. PCT/KR2010/002237, filed on Apr. 12, 2010, which claims the benefit of earlier filing date and right of priority to Korean Application No. 10-2009-0067777, filed on Jul. 24, 2009, and also claims the benefit of U.S. Provisional Application Ser. No. 61/169,304, filed on Apr. 14, 2009, the contents of all of which are incorporated by reference herein in their entireties.

BACKGROUND OF THE INVENTION

1. Field of the Invention

The present invention relates to a wireless communication system, and more particularly, to a method of transmitting and receiving data in a wireless communication system.

2. Discussion of the Related Art

Recently, standardization of an IEEE 802.16m system is in progress. However, IEEE 802.16e terminals of the related art have already come into wide use at a point of time when the IEEE 802.16m system is commercially available. Accordingly, the IEEE 802.16m system needs to be standardized to be compatible with the IEEE 802.16e system. The IEEE 802.16m system requires a frame structure capable of supporting an IEEE 802.16e terminal.

The frame of the IEEE 802.16m system includes a plurality of subframes. A subframe includes a plurality of subcarriers on a frequency axis and includes a plurality of OFDM symbols on a time axis. Some of the plurality of subframes included in one frame are used for transmitting uplink data and the rest are used for transmitting downlink data.

In order to support the IEEE 802.16e terminal, the IEEE 802.16m system uses some downlink subframes for the IEEE 802.16m system and uses the rest of the downlink subframes for the IEEE 802.16e system. A zone used for the IEEE 802.16e system is called a wireless metropolitan area network orthogonal frequency division multiple access downlink zone (hereinafter, referred to as "WirelessMAN OFDM DL zone") and a zone used for the IEEE 802.16m system is called an Advanced Air Interface downlink zone (hereinafter, referred to as "Advanced Air Interface DL zone").

A downlink frame structure with a bandwidth of 8.75 MHz of the IEEE 802.16m system according to the related art will be described with reference to FIGS. 1 and 2.

FIG. 1 is a diagram showing a downlink frame structure according to the related art in the case where a frame offset is 1, and FIG. 2 is a diagram showing a downlink frame structure according to the related art in the case where a frame offset is 2.

The frame offset according to the related art defines an offset between a start point of a frame for an IEEE 802.16e system and a start point of a frame for an IEEE 802.16m system in the unit of subframes. However, since the frame for the IEEE 802.16m system includes one or more downlink subframes, the frame offset is an integer equal to or greater than 1 and less than the number of downlink subframes. For example, if one frame includes five downlink subframes, the frame offset is an integer equal to or greater than 1 and less than 5.

The subframes for the IEEE 802.16m system may be divided into four types. A type 1 subframe includes six OFDM symbols, a type 2 subframe includes seven OFDM symbols, a type 3 subframe includes five OFDM symbols, and a type 4 subframe includes nine OFDM symbols.

As shown in FIGS. 1 and 2, in the frame structure of the related art, the WirelessMAN OFDMA DL zone includes a type 1 subframe. That is, the WirelessMAN OFDMA DL zone includes six OFDM symbols in FIG. 1 and the WirelessMAN OFDMA DL zone includes 12 OFDM symbols in FIG. 2. A preamble is allocated to a first OFDM symbol of the frame for the IEEE 802.16e system and a FCH and a DL-MAP are allocated to second and third OFDM symbols.

A subchannelization method of the IEEE 802.16e system includes partial usage of subchannel (hereinafter, referred to as "PUSC"), full usage of subchannel (hereinafter, referred to as "FUSC") and adaptive modulation and coding (hereinafter, referred to as "AMC"). The PUSC includes two OFDM symbols, the FUSC includes one OFDM symbol, and the AMC includes three OFDM symbols. The second and third OFDM symbols, to which the FCH and the DL-MAP are allocated, are subchannelized by the PUSC.

Accordingly, referring to FIG. 1, odd OFDM symbols are present in a portion excluding portions, to which the preamble, the FCH and the DL-MAP are allocated, in the WirelessMAN OFDMA DL zone.

However, when the odd OFDM symbols are subchannelized, a FUSC or Band-AMC method should be used. Therefore, in order to report that the subchannelization method is changed, a control message should be transmitted to a terminal. If subchannelization is performed using the PUSC and subchannelization is then performed using another method, resources can not be consecutively used.

As described above, in the frame structure of the related art, since the control message should be transmitted in order to inform the terminal that the subchannelization method is changed, overhead is increased. In addition, when the subchannelization is changed, resources can not be consecutively used. Thus, radio resources are wasted.

SUMMARY OF THE INVENTION

Accordingly, the present invention is directed to a method of transmitting and receiving data in a wireless communication system that substantially obviates one or more problems due to limitations and disadvantages of the related art.

An object of the present invention is to provide a method of transmitting data using a frame structure able to improve efficiency of a wireless communication system.

Another object of the present invention is to provide a method of transmitting data, which is capable of reducing overhead and efficiently utilizing radio resources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data in a wireless communication system includes, at a base station, transmitting downlink data to a first terminal supporting a first system through a first zone of a frame; and transmitting downlink data to a second terminal supporting a second system through a second zone, wherein the second zone is located behind the first zone by a frame offset on a time axis, wherein the wireless communication system supports a bandwidth of 8.75 MHz, the frame offset is an offset between a start point of a frame for the first system and a start point of a frame for the second system, and the first zone includes 3+6*(frame offset−1) Orthogonal Frequency Division Multiplexing (OFDM) symbols.

In another aspect of the present invention, a method of receiving data in a wireless communication system includes, at a terminal, receiving downlink data through a second zone of a frame, wherein the second zone is located behind a first zone by a frame offset, wherein the first zone is used for transmitting downlink data to another terminal supporting a system different from a system supported by the terminal, wherein the wireless communication system supports a bandwidth of 8.75 MHz, the first zone includes 3+6*(frame offset−1) Orthogonal Frequency Division Multiplexing (OFDM) symbols, and the frame offset is an offset between a start point of a frame for the first system and a start point of a frame for the second system.

At this time, the wireless communication system may support a type 1 subframe including six OFDM symbols and a type 2 subframe including three OFDM symbols.

All subframes included in the second zone may be type 1 subframes.

The embodiments of the present invention have the following effects.

First, since a subframe including three OFDM symbols is included in a frame offset, all OFDM symbols can be subchannelized using one method and thus overhead can be reduced.

Second, since a second zone includes only a type 1 subframe, a physical layer structure of the related art may be utilized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
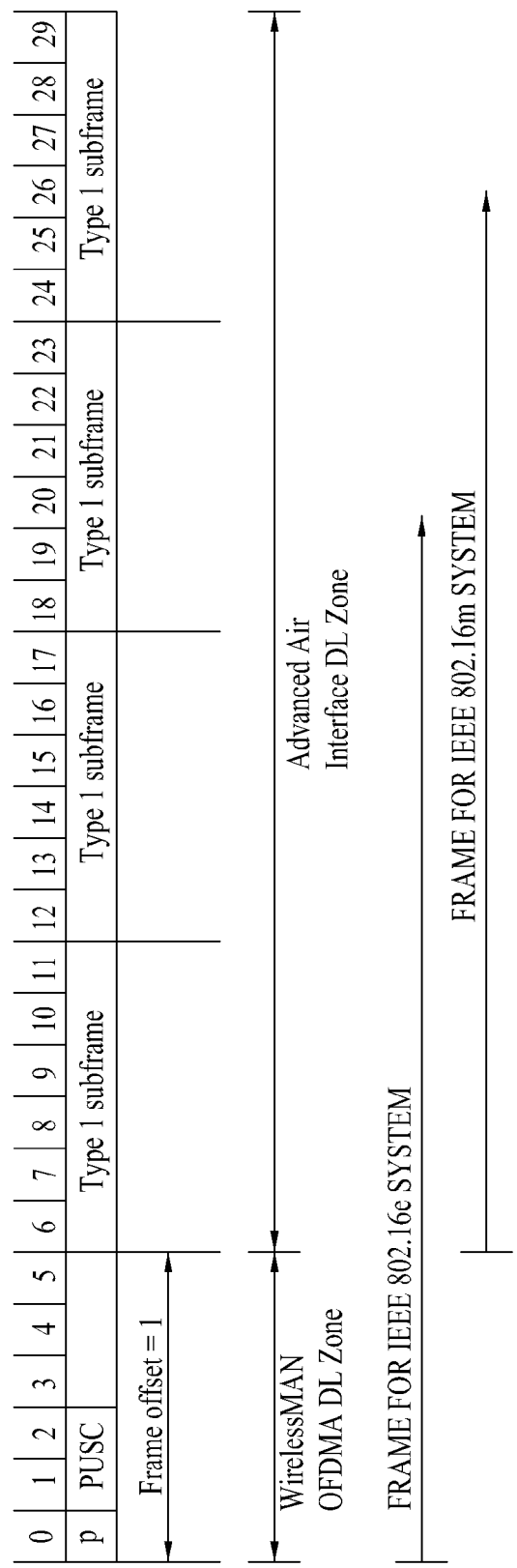
FIG. 1 is a diagram showing a downlink frame structure according to the related art in the case where a frame offset is 1.
Figure 2:
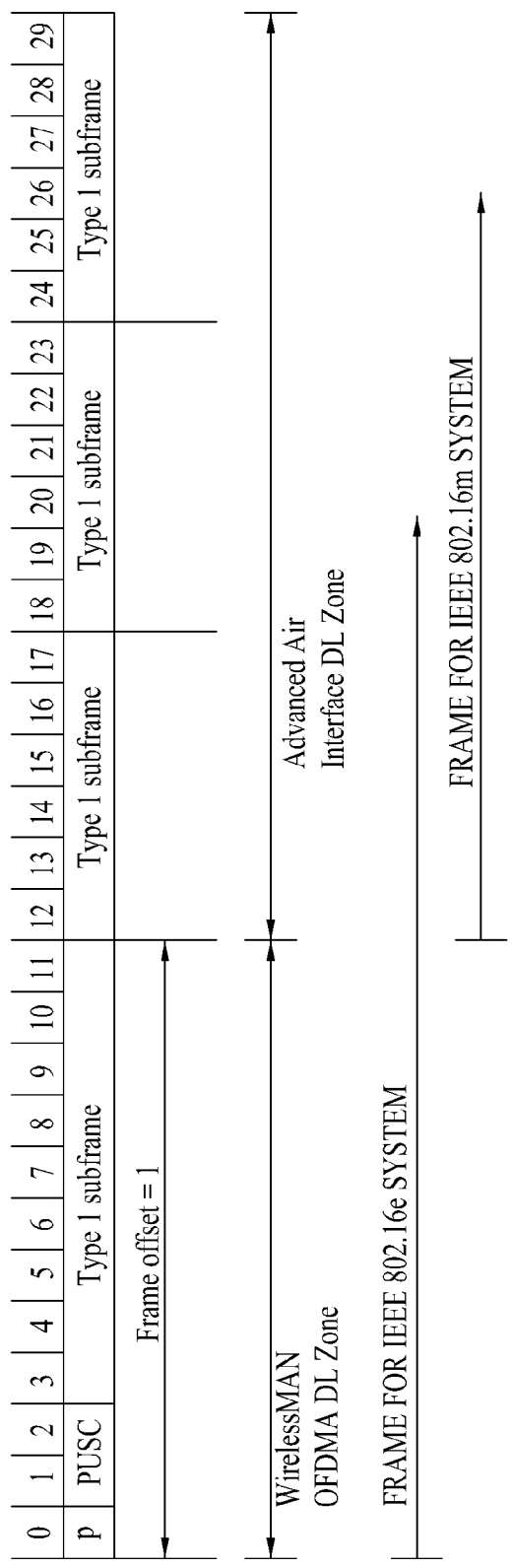
FIG. 2 is a diagram showing a downlink frame structure according to the related art in the case where a frame offset is 2.

Reference will now be made in detail to the preferred embodiments of the present invention, examples of which are illustrated in the accompanying drawings. The present invention may be implemented in various forms and is not limited to the following embodiments. In order to clearly describe the present invention, portions unrelated to the description of the present invention are omitted in the drawings. Wherever possible, the same reference numbers will be used throughout the drawings to refer to the same or like parts.

In the entire specification, when any portion "includes" any element, unless explicitly described to the contrary, the word "includes" will be understood to imply the inclusion of stated elements but not the exclusion of any other elements. The terms "-part", "-or/-er" and "module" indicate a unit for performing at least one function or operation, which may be implemented by hardware, software or a combination thereof.

Figure 3:
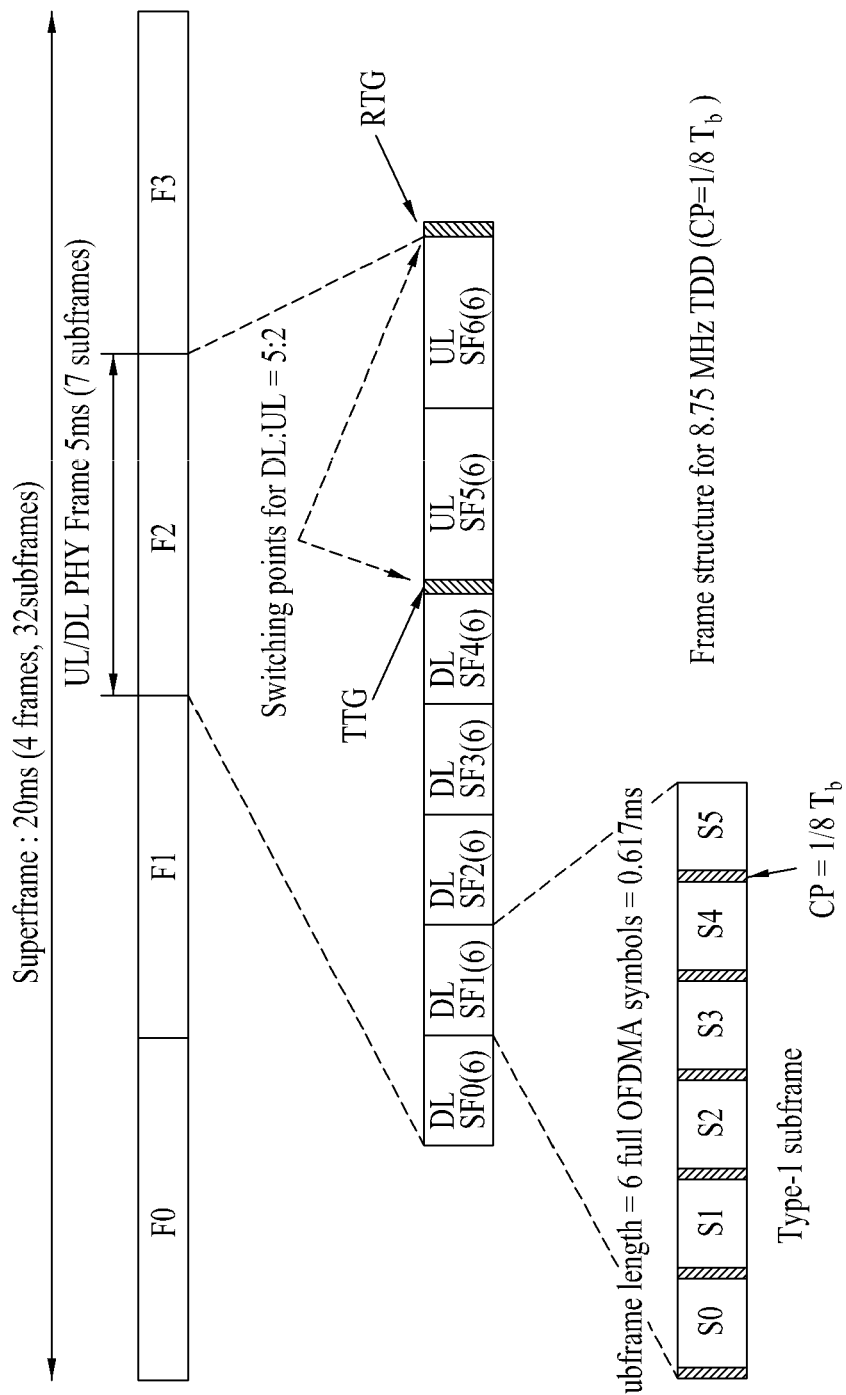
FIG. 3 is a diagram showing a frame structure of a Time Division Duplexing (TDD) wireless communication system with a bandwidth of 8.75 MHz and a Cyclic Prefix (CP) which is ⅛ of an available symbol time.

First, a Time Division Duplexing (TDD) frame structure in a wireless communication system in the case where a bandwidth is 8.75 MHz, a Cyclic Prefix (CP) is ⅛ of an available symbol time and a ratio of downlink to uplink subframes is 5:2 will be described with reference to FIG. 3. FIG. 3 is a diagram showing a frame structure of a TDD wireless communication system with a bandwidth of 8.75 MHz and a CP which is ⅛ of an available symbol time.

As shown in FIG. 3, a superframe includes four frames and each frame includes seven subframes. The superframe includes a superframe header (SFH).

The subframe includes a plurality of subcarriers on a frequency axis and a plurality of OFDM symbols on a time axis. The subframes may be divided into four types according to the number of OFDM symbols included in the subframe. A type 1 subframe includes six OFDM symbols, a type 2 subframe includes seven OFDM symbols, a type 3 subframe includes five OFDM symbols, and a type 4 subframe includes nine OFDM symbols. Referring to FIG. 3, three of six subframes are type 1 subframes and the rest are type 3 subframes.

Seven subframes included in one frame may be used for uplink or downlink transmission, and a portion for uplink transmission and a portion for downlink transmission may be subjected to Frequency Division Duplexing (FDD) or Time Division Duplexing (TDD). FIG. 3 shows the frame structure for the TDD case. A frame, in which a portion for uplink transmission and a portion for downlink transmission are subjected to FDD, is called an FDD frame and a frame, in which a portion for uplink transmission and a portion for downlink transmission are subjected to TDD, is called a TDD frame.

The TDD frame is obtained by dividing a frame into a zone for downlink transmission and a zone for uplink transmission on a time axis. That is, some of a plurality of subframes included in the frame are used for downlink transmission and the rest are used for uplink transmission. The number of subframes used for downlink transmission and the number of subframes used for uplink transmission are determined according to a ratio of downlink to uplink subframes. For example, as shown in FIG. 3, five front subframes of seven subframes included in one frame may be used for downlink transmission and two rear subframes may be used for uplink transmission.

A switching time is present between a downlink subframe and an uplink subframe.

The present invention relates to a method of transmitting downlink data to a terminal supporting a first system and a terminal supporting a second system through a frame in which a portion for uplink transmission and a portion for downlink transmission are subjected to TDD.

FIG. 3 shows a frame structure in the case where a base station of a wireless communication system supports one system when a bandwidth is 8.75 MHz. The wireless communication system needs to support a new system as well as the existing system. Accordingly, in the embodiment of the present invention, a frame structure in the case where a wireless communication system supports the new system as well as the existing system when the bandwidth is 8.75 MHz is proposed.

Next, a method of transmitting data to a terminal supporting a first system and a terminal supporting a second system at a base station of a wireless communication system according to a first embodiment of the present invention will be described with reference to FIGS. 4 to 6.

According to the present embodiment of the present invention, the base station divides a plurality of downlink subframes included in a frame into a first zone and a second zone, transmits a downlink signal to a terminal supporting a first system through the first zone, and transmits a downlink signal to a terminal for a second system through the second zone.

A downlink frame structure according to the first embodiment of the present invention will be described with reference to FIGS. 4 to 6.

Figure 4:
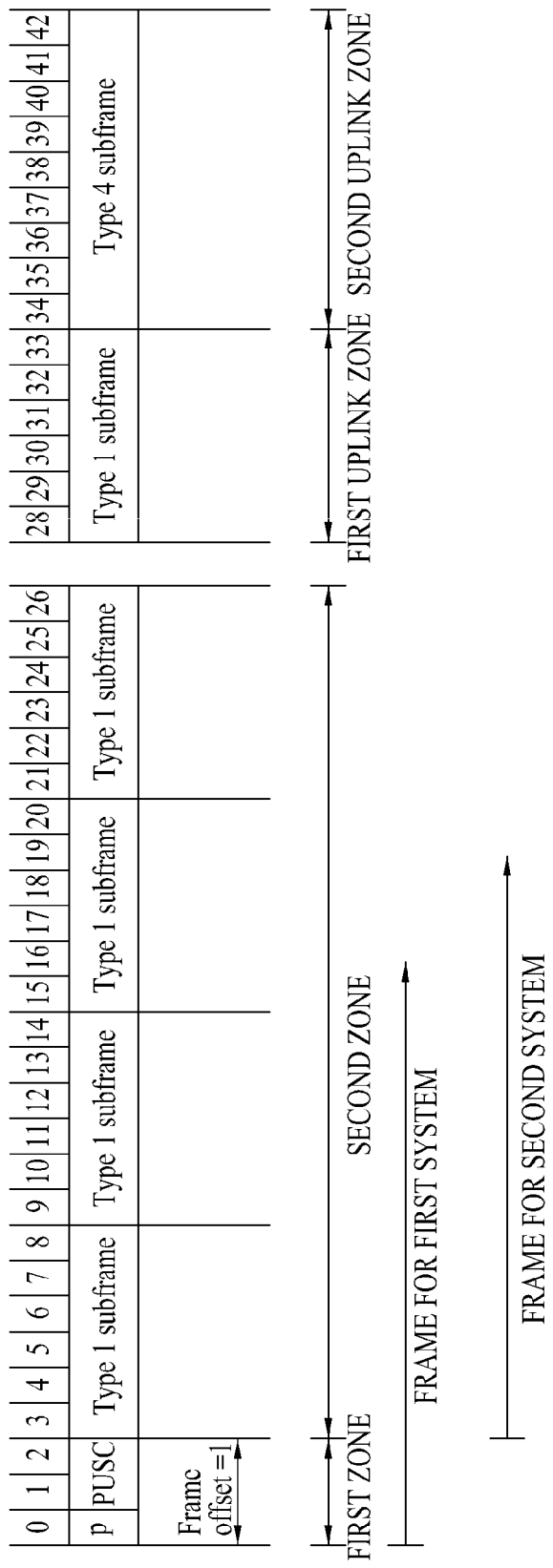
FIG. 4 is a diagram showing a frame structure according to a first embodiment of the present invention in the case where a frame offset is 1.
Figure 5:
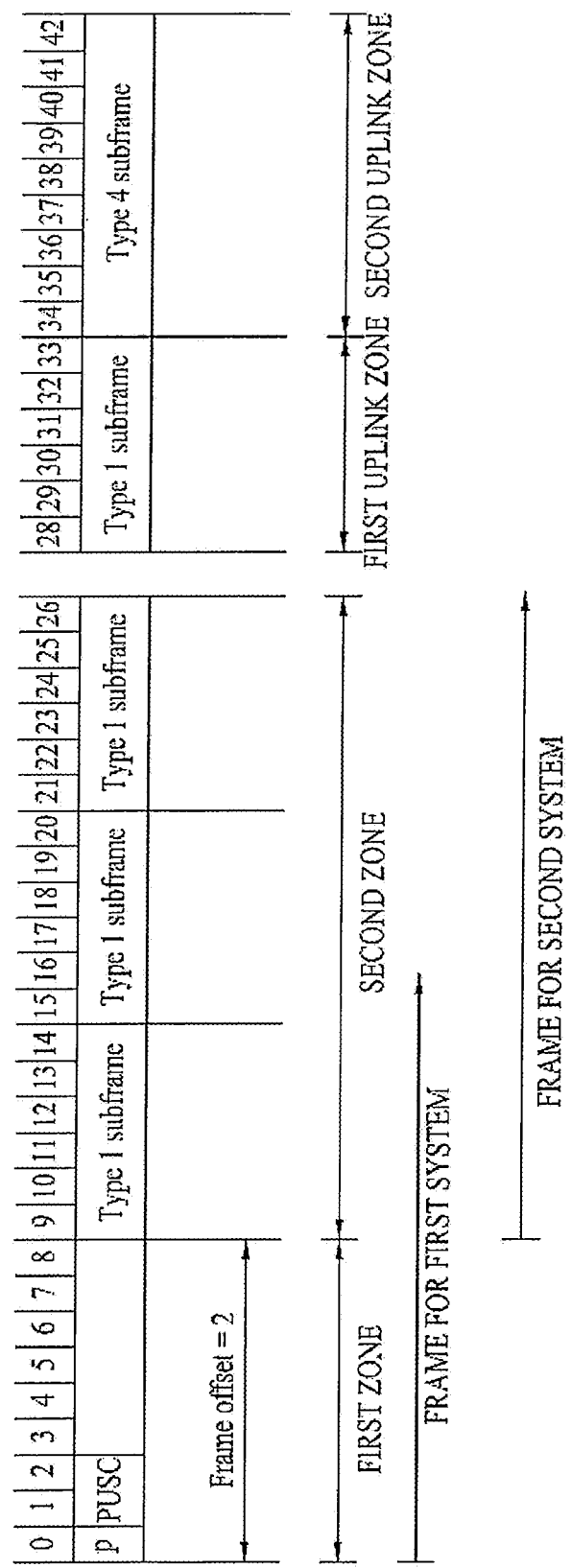
FIG. 5 is a diagram showing a frame structure according to the first embodiment of the present invention in the case where a frame offset is 2.
Figure 6:
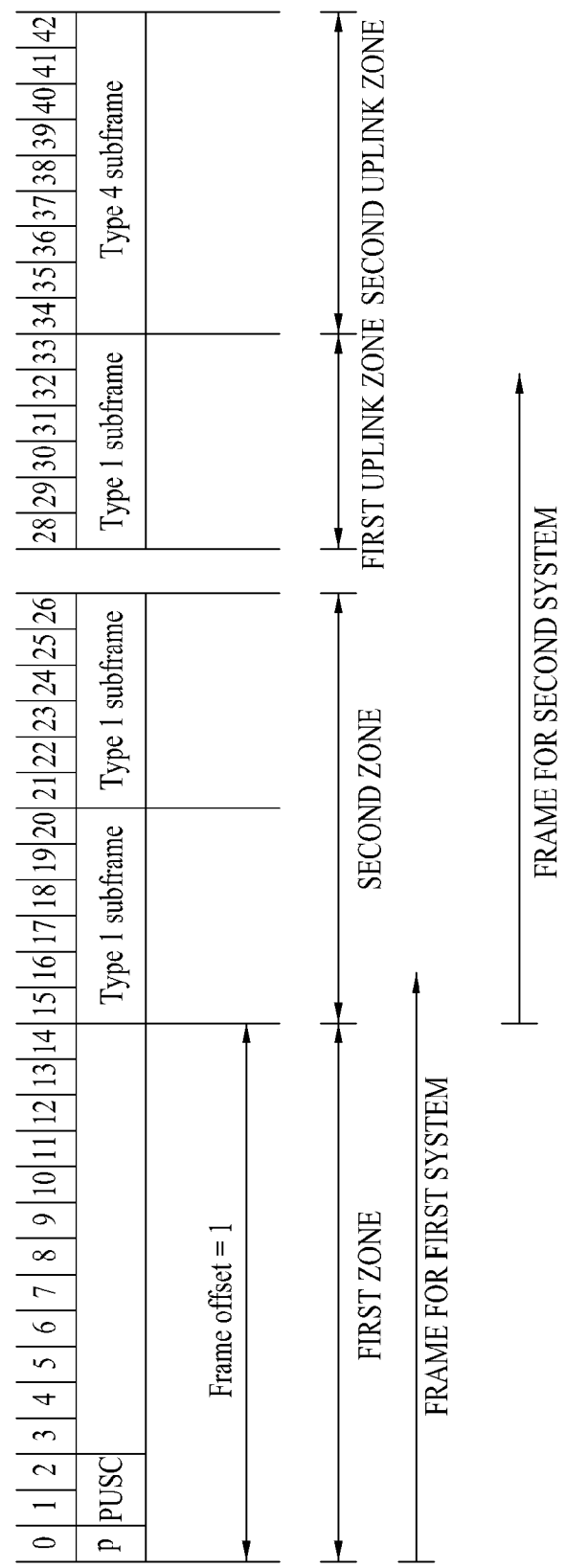
FIG. 6 is a diagram showing a frame structure according to the first embodiment of the present invention in the case where a frame offset is 3.

FIG. 4 is a diagram showing a frame structure according to the first embodiment of the present invention in the case where a frame offset is 1, FIG. 5 is a diagram showing a frame structure according to the first embodiment of the present invention in the case where a frame offset is 2, and FIG. 6 is a diagram showing a frame structure according to the first embodiment of the present invention in the case where a frame offset is 3.

The frame offset is an offset between a start point of a frame for the first system and a start point of a frame for the second system.

In FIGS. 4 and 5, a horizontal axis denotes time, "p" denotes a preamble of the first system, and "PUSC" denotes a symbol subchannelized by PUSC. The first zone is a zone for communicating with a terminal supporting the first system and the second zone is a zone for communicating with a terminal for the second system. The frame for the first system starts from a first OFDM symbol of the first zone and the frame for the second system starts from a first OFDM symbol of the second zone.

Although FIGS. 4 to 6 show the downlink frame when the ratio of the downlink to uplink subframes is 5:2, the present invention is not limited thereto.

As shown in FIGS. 4 to 6, if the ratio of the downlink to uplink subframes is 5:2, the downlink subframe includes 27 OFDM symbols.

The downlink subframe according to the first embodiment of the present invention includes a mini-subframe including three OFDM symbols, for time alignment with an IEEE 802.16e system. The use of a subframe including three OFDM symbols as a first subframe of a downlink frame maintains Transmission Time Interval (TTI) transmission of the unit of type 1 subframes of the IEEE 802.16m system by using front subframes of the downlink frame for the IEEE 802.16e system and using subframes including six rear OFDM symbols for the IEEE 802.16m system, if a terminal operating in an IEEE 802.16e system mode and a terminal operating in an IEEE 802.16m system mode are mixed.

The first zone includes 3+6*(frame offset−1) OFDM symbols. That is, the first zone includes three OFDM symbols in FIG. 4, the second zone includes nine OFDM symbols in FIG. 5, and the second zone includes 15 OFDM symbols in FIG. 6.

The first zone includes a mini-subframe at a foremost portion. If the frame offset is 1, as shown in FIG. 4, the first zone includes one mini-subframe. If the frame offset is 2, as shown in FIG. 5, the first zone includes one mini-subframe and one type 1 subframe. Whenever the frame offset is increased one by one, the number of type 1 subframes included in the first zone is increased one by one. That is, the frame offset includes the mini-subframe and may further include the type 1 subframe.

All the subframes included in the second zone are type 1 subframes.

Figure 7:
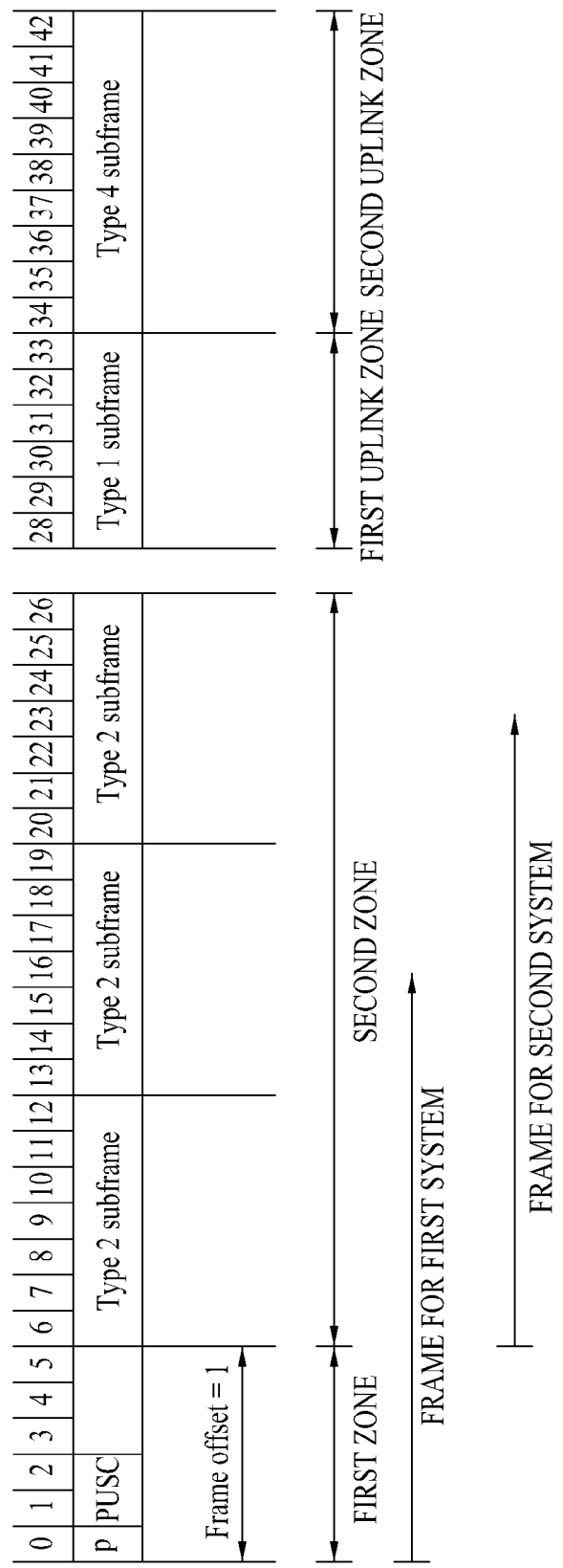
FIG. 7 is a diagram showing a downlink frame structure according to a second embodiment of the present invention in the case where a frame offset is 1.

Next, a method of transmitting data to a terminal supporting a first system and a terminal supporting a second system at a base station of a wireless communication system according to a second embodiment of the present invention will be described with reference to FIG. 7. FIG. 7 is a diagram showing a frame structure according to the second embodiment of the present invention in the case where a frame offset is 1.

As shown in FIG. 7, a downlink frame includes 27 OFDM symbols. The downlink frame according to the second embodiment of the present invention includes three type 2 subframes and one type 1 subframe.

All the subframes included in the second zone are type 2 subframes and the first zone includes 6+7*(frame offset−1) OFDM symbols.

Figure 8:
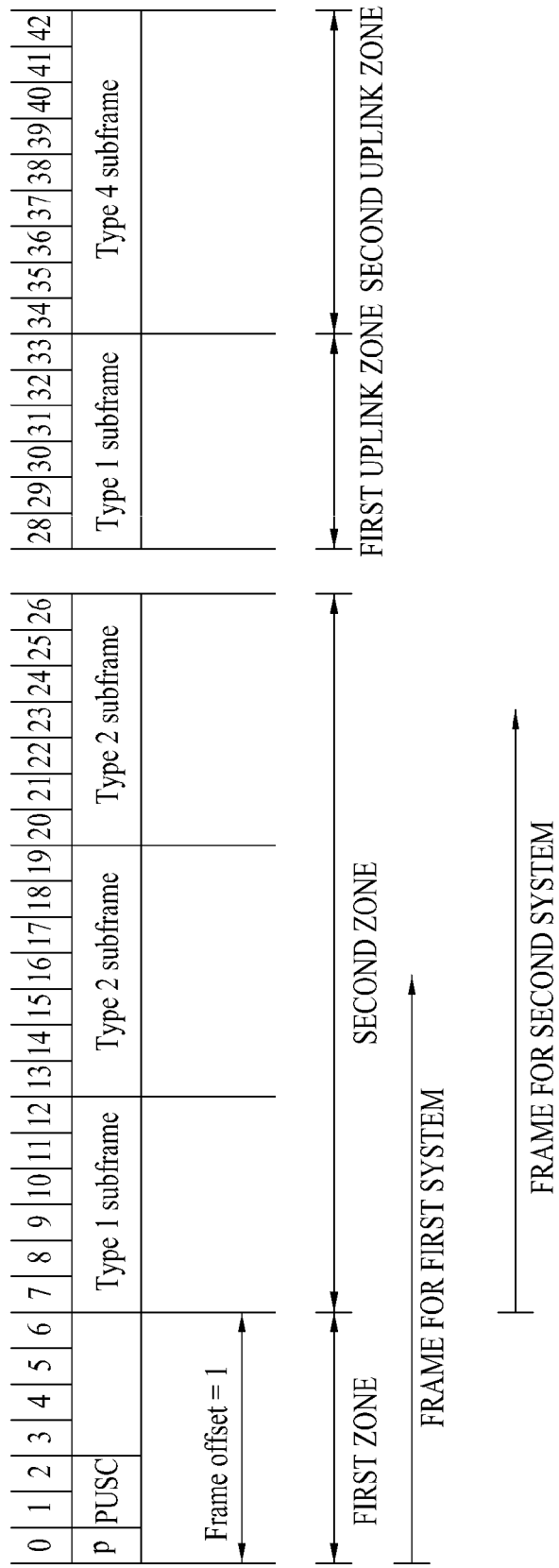
FIG. 8 is a diagram showing a downlink frame structure according to the second embodiment of the present invention if a type 1 subframe is included in a second zone.

Since a superframe header of the IEEE 802.16m system is composed of a type 1 subframe, it is preferable that the second zone include at least one type 1 subframe. Accordingly, as shown in FIG. 8, a downlink frame may be configured such that the type 1 subframe is included in the second zone. FIG. 8 is a diagram showing a downlink frame structure according to the second embodiment of the present invention if a type 1 subframe is included in a second zone.

Referring to FIG. 8, the downlink frame according to the second embodiment of the present invention includes three type 2 subframes and one type 1 subframe, and the first zone includes 7*(frame offset) OFDM symbols.

Figure 9:
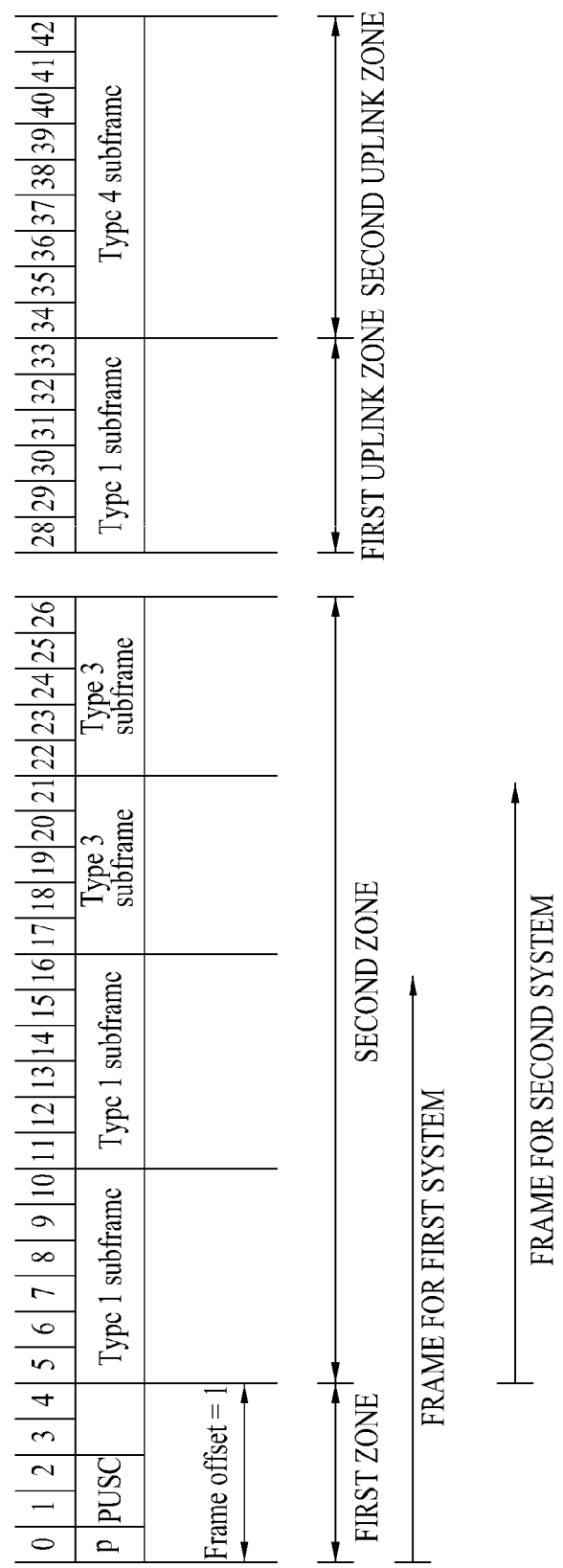
FIG. 9 is a diagram showing a downlink frame structure according to a third embodiment of the present invention in the case where a frame offset is 1.

Next, a method of transmitting data to a terminal supporting a first system and a terminal supporting a second system at a base station of a wireless communication system according to a third embodiment of the present invention will be described with reference to FIGS. 9 and 10. FIG. 9 is a diagram showing a downlink frame structure according to the third embodiment of the present invention in the case where a frame offset is 1, and FIG. 10 is a diagram showing a downlink frame structure according to the third embodiment of the present invention in the case where a frame offset is 2.

Figure 10:
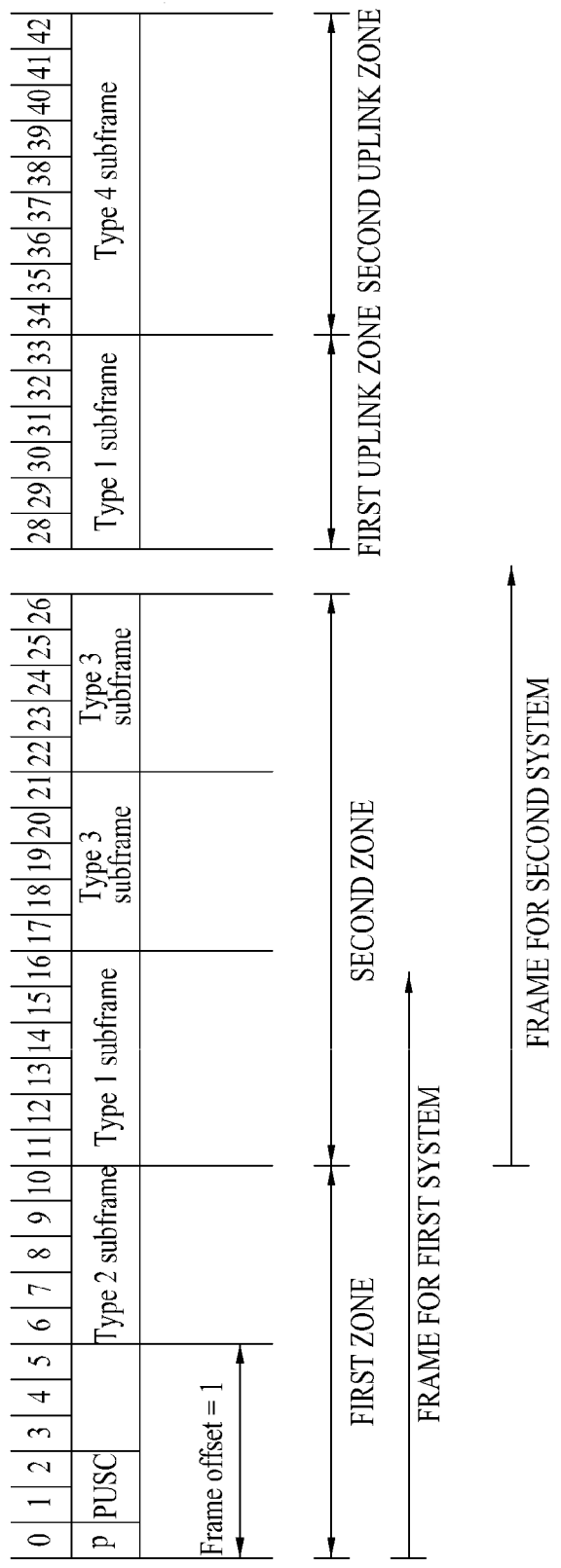
FIG. 10 is a diagram showing a downlink frame structure according to the third embodiment of the present invention in the case where a frame offset is 2.

As shown in FIGS. 9 and 10, the downlink frame according to the third embodiment of the present invention includes 27 OFDM symbols and the downlink frame includes three type 3 subframes and two type 1 subframes.

Both type 1 subframes may be included in the second zone as shown in FIG. 9 or one type 1 subframe may be included in the first zone and the other type 1 subframe may be included in the second zone as shown in FIG. 10.

The first zone includes 5*(frame offset) OFDM symbols in FIG. 9 and the first zone includes 6+5*(frame offset−1) OFDM symbols in FIG. 10.

The embodiments of the present invention can be implemented by a variety of means, for example, hardware, firmware, software, or a combination thereof. In the case of implementing the present invention by hardware, the method of transmitting and receiving the data according to the embodiment of the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It is obvious to those skilled in the art that the above embodiments may be constructed by combining claims having no explicitly stated relationship or new claims may also be added by amendment after patent application.

What is claimed is:

1. A method of transmitting data at a base station of a wireless communication system, the method comprising:
    transmitting downlink data to a first terminal supporting a first system through a first zone of a frame; and
    transmitting downlink data to a second terminal supporting a second system through a second zone, wherein a starting point of the second zone is separated from a starting point of the first zone by a frame offset on a time axis,
    wherein the wireless communication system supports a bandwidth of 8.75 MHz, the frame offset is an offset between a start point of a frame for the first system and a start point of a frame for the second system, and the first zone includes 3+6*(frame offset−1) Orthogonal Frequency Division Multiplexing (OFDM) symbols.

2. The method according to claim 1, wherein the wireless communication system supports a type 1 subframe including six OFDM symbols and a type 2 subframe including seven OFDM symbols.

3. The method according to claim 2, wherein all subframes included in the second zone are type 1 subframes.

4. A method of receiving data at a terminal of a wireless communication system, the method comprising:
    receiving downlink data through a second zone of a frame, wherein a starting point of the second zone is separated from a starting point of a first zone by a frame offset, wherein the first zone is used for transmitting downlink data to another terminal supporting a second system different from a first system supported by the terminal,
    wherein the wireless communication system supports a bandwidth of 8.75 MHz, the first zone includes 3+6* (frame offset−1) Orthogonal Frequency Division Multiplexing (OFDM) symbols, and the frame offset is an offset between a start point of a frame for the first system and a start point of a frame for the second system.

5. The method according to claim 4, wherein the wireless communication system supports a type 1 subframe including six OFDM symbols and a type 2 subframe including seven OFDM symbols.

6. The method according to claim 5, wherein all subframes included in the second zone are type 1 subframes.

* * * * *